US010464557B2

(12) United States Patent
Sogen et al.

(10) Patent No.: US 10,464,557 B2
(45) Date of Patent: Nov. 5, 2019

(54) INFORMATION PROCESSING APPARATUS AND INFORMATION PROCESSING METHOD

(71) Applicant: Toyota Jidosha Kabushiki Kaisha, Toyota-shi, Aichi-ken (JP)

(72) Inventors: Kiyohiro Sogen, Shizuoka-ken (JP); Hiroyuki Aono, Susono (JP); Yoshihiro Ohe, Kawasaki (JP); Akiomi Kunisa, Hirakata (JP); Junichi Meguro, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 127 days.

(21) Appl. No.: 15/677,495

(22) Filed: Aug. 15, 2017

(65) Prior Publication Data

US 2018/0056992 A1 Mar. 1, 2018

(30) Foreign Application Priority Data

Aug. 26, 2016 (JP) .................................. 2016-166053

(51) Int. Cl.
*G08G 1/00* (2006.01)
*G01C 21/32* (2006.01)
(Continued)

(52) U.S. Cl.
CPC ............. *B60W 30/08* (2013.01); *G01C 21/32* (2013.01); *G01C 21/3617* (2013.01);
(Continued)

(58) Field of Classification Search
CPC ......... G08G 1/00; G01C 21/32; B60W 30/08; G05D 1/024; G05D 1/0278; G05D 1/0214
(Continued)

(56) References Cited

U.S. PATENT DOCUMENTS 6,862,524 B1 * 3/2005 Nagda ................ G01C 21/3492
340/988
8,280,601 B2 * 10/2012 Huang .................. B60W 40/09
701/70
(Continued)

FOREIGN PATENT DOCUMENTS

JP 4913880 B2 4/2012
JP 2015-175825 A 10/2015
JP 2016-030513 A 3/2016

OTHER PUBLICATIONS

U.S. Appl. No. 15/676,363, filed Aug. 14, 2017 Inventors: Kiyohiro Sogen et al.

*Primary Examiner* — Tan Q Nguyen
(74) *Attorney, Agent, or Firm* — Dinsmore & Shohl LLP (57) ABSTRACT

An information processing apparatus capable of communicating with a plurality of autonomous driving vehicles includes: a storage unit configured to store a location of an autonomous driving difficult section on a map in association with a predetermined release condition; and a control unit configured to acquire from the plurality of autonomous driving vehicles reporting data of each of the autonomous driving vehicles through communication, the reporting data including a location of the vehicle on the map and at least one of reliability of the autonomous driving, difficulty state information indicative of the autonomous driving being difficult or not difficult, and a result of driver intervention, and the control unit being configured to determine whether to release the autonomous driving difficult section based on the acquired reporting data and on the location and the release condition of the autonomous driving difficult section stored in the storage unit.

16 Claims, 8 Drawing Sheets (51) Int. Cl.
  *B60W 30/08*  (2012.01)
  *G01C 21/36*  (2006.01)
  *G05D 1/00*  (2006.01)
  *G05D 1/02*  (2006.01)
  *G06K 9/00*  (2006.01)
  *G06T 7/20*  (2017.01)
  *G06F 16/29*  (2019.01)
  *G08G 1/01*  (2006.01)
  *G08G 1/0967*  (2006.01)

(52) U.S. Cl.
  CPC ......... *G05D 1/0055* (2013.01); *G05D 1/0061* (2013.01); *G05D 1/0088* (2013.01); *G05D 1/0214* (2013.01); *G05D 1/0276* (2013.01); *G06F 16/29* (2019.01); *G06K 9/00201* (2013.01); *G06K 9/00805* (2013.01); *G06T 7/20* (2013.01); *G08G 1/0112* (2013.01); *G08G 1/0129* (2013.01); *G08G 1/0133* (2013.01); *G08G 1/0141* (2013.01); *G08G 1/09675* (2013.01); *G08G 1/096725* (2013.01); *G08G 1/096741* (2013.01); *G08G 1/096775* (2013.01); *B60R 2300/30* (2013.01); *B60W 2550/22* (2013.01); *G05D 1/024* (2013.01); *G05D 1/0274* (2013.01); *G05D 1/0278* (2013.01); *G05D 2201/0213* (2013.01); *G06T 2207/30261* (2013.01)

(58) Field of Classification Search
  USPC ......................................................... 701/26
  See application file for complete search history.

(56)      References Cited

U.S. PATENT DOCUMENTS

| | | | |
|---|---|---|---|
| 8,509,982 B2 | 8/2013 | Montemerlo et al. | |
| 2009/0287367 A1* | 11/2009 | Salinger | G05D 1/0246 701/23 |
| 2009/0319096 A1* | 12/2009 | Offer | G06Q 10/06 701/2 |
| 2018/0356817 A1* | 12/2018 | Poeppel | B60W 50/08 |

* cited by examiner

| LOCATION OF AUTONOMOUS DRIVING DIFFICULT SECTION | SETTING REASON | RELEASE CONDITION |
|---|---|---|
| SECTION A3 | OBSTACLE | RELEASE CONDITION K1 |
| SECTION A5 | BLURRED BOUNDARY LINE | RELEASE CONDITION K1 |
| SECTION B3 | WORSENED WEATHER | RELEASE CONDITION K1 |
| SECTION B7 | OCCURRENCE OF OVERRIDE | RELEASE CONDITION K2 |
| SECTION C11 | OVERSPEED | RELEASE CONDITION K1 |
| ⋮ | ⋮ | ⋮ |

INFORMATION PROCESSING APPARATUS AND INFORMATION PROCESSING METHOD

CROSS-REFERENCE TO RELATED APPLICATIONS

This application claims priority to Japanese Patent Application No. 2016-166053 filed on Aug. 26, 2016 which is incorporated herein by reference in its entirety.

BACKGROUND

1. Technical Field

The present disclosure relates to an information processing apparatus and an information processing method.

2. Description of Related Art

U.S. Pat. No. 8,509,982 discloses a vehicle capable of communication. The vehicle informs a driver that the vehicle is approaching an area where autonomous driving is hard with reference to a map storing areas where autonomous driving is hard. The areas where autonomous driving is hard include sections where autonomous driving is difficult where autonomous driving can be continued at lowered speeds and autonomous driving prohibition sections where autonomous driving is prohibited. The areas where autonomous driving is hard may also be set by drivers. For example, when a driver notices temporary construction, the driver sets the site of the temporary construction as an area where autonomous driving is hard. The driver can set a validity term (data maintain period) for the area where autonomous driving is hard set by him or herself. The information on the area where autonomous driving is hard is shared with the other vehicles through a network.

SUMMARY

The vehicle disclosed in U.S. Pat. No. 8,509,982 and other vehicles release the sections where autonomous driving is difficult with the validity terms set by specific drivers. However, the sections where autonomous driving is difficult may be set not only because temporary road repairing occurs. For example, the sections where autonomous driving is difficult are set for the reason that a difference is generated between a road on a map and an actual road, set for the reason that overspeed frequently occurs at a curve point, or set for the reason that override (intervention by drivers) frequently occurs during autonomous driving. When the sections where autonomous driving is difficult are set because of these reasons, it is difficult to set validity terms for these sections. It is therefore not appropriate to determine release of the sections where autonomous driving is difficult based only on the validity terms. In this technology field, there is a demand for an information processing apparatus capable of appropriately releasing the sections where autonomous driving is difficult.

An information processing apparatus according to a first aspect of the present disclosure is an information processing apparatus capable of communicating with a plurality of autonomous driving vehicles. The information processing apparatus includes: a storage unit configured to store a location of an autonomous driving difficult section on a map in association with a predetermined release condition, the autonomous driving difficult section being a traveling section where autonomous driving is difficult; and a control unit configured to acquire from the plurality of autonomous driving vehicles reporting data of each of the autonomous driving vehicles through communication, the reporting data including a location of the vehicle on the map and at least one of reliability of the autonomous driving, difficulty state information indicative of the autonomous driving being difficult or not difficult, and a result of driver intervention, and the control unit being configured to determine whether or not to release the autonomous driving difficult section based on the acquired reporting data and on the location and the release condition of the autonomous driving difficult section stored in the storage unit.

In the information processing apparatus, the storage unit stores the location of an autonomous driving difficult section on the map in association with a release condition thereof It is determined whether to release the autonomous driving difficult section based on the acquired reporting data in the autonomous driving difficult section and on the location and the release condition of the autonomous driving difficult section. The reporting data includes the reliability of the autonomous driving or the result of driver intervention. That is, the information processing apparatus determines whether or not to release the autonomous driving difficult section in consideration of the reliability of autonomous driving or the result of driver intervention based on the release condition. Accordingly, it is possible to appropriately release the autonomous driving difficult section as compared with the case of determining whether or not to release the autonomous driving difficult section based only on the validity term.

In the first aspect of the present disclosure, the storage unit may be configured to store a location of a first autonomous driving difficult section that is the autonomous driving difficult section on the map in association with a first release condition as the release condition that the reliability of the autonomous driving is not at a threshold value or below, and the control unit may be configured to determine release of the first autonomous driving difficult section when the reporting data in the first autonomous driving difficult section does not include the reliability at the threshold value or below. For example, the first autonomous driving difficult section may be set for the reason that the reliability of the autonomous driving is deteriorated. When the reporting data in the first autonomous driving difficult section does not include reliability at the threshold value or below, it indicates that the autonomous driving vehicles have been able to move with given certainty in the first autonomous driving difficult section. Accordingly, the information processing apparatus can determine that the autonomous driving is not difficult in the pertinent section. Thus, the information processing apparatus can appropriately release the autonomous driving difficult section with the reliability.

In the first aspect of the present disclosure, the first autonomous driving difficult section may be a section set as the autonomous driving difficult section due to existence of an obstacle.

In the first aspect of the present disclosure, the first autonomous driving difficult section may be a section set as the autonomous driving difficult section due to a blurred street boundary line.

In the first aspect of the present disclosure, the first autonomous driving difficult section may be a section set as the autonomous driving difficult section due to of bad weather.

In the first aspect of the present disclosure, the first autonomous driving difficult section may be a section set as the autonomous driving difficult section based on detection of a speed exceeding support speeds of the autonomous driving.

In the first aspect of the present disclosure, the storage unit may be configured to store a location of a second autonomous driving difficult section that is the autonomous driving difficult section on the map in association with a second release condition as the release condition that the total number of times of driver intervention being a prescribed number of times or less as the release condition, and the control unit may be configured to determine release of the second autonomous driving difficult section when the total number of times of the driver intervention included in the reporting data in the second autonomous driving difficult section is the prescribed number of times or less. For example, the second autonomous driving difficult section may be set for the reason that driver intervention occurred frequently. When the total number of times of driver intervention included in the reporting data in the second autonomous driving difficult section is a prescribed number of times or less, it indicates that the autonomous driving vehicles have been able to move in accordance with the intension of the drivers in the second autonomous driving difficult section. Accordingly, the information processing apparatus can determine that the autonomous driving is not difficult in the pertinent section. Thus, the information processing apparatus can appropriately release the autonomous driving difficult section using the number of times of driver intervention.

In the first aspect of the present disclosure, the second autonomous driving difficult section may be a section set as the autonomous driving difficult section where the driver intervention occurs more than the prescribed number of times.

In the first aspect of the present disclosure, the storage unit may be configured to store a location of a first autonomous driving difficult section that is the autonomous driving difficult section on the map in association with a first release condition as the release condition that the total number of times that the autonomous driving is difficult is a prescribed number of times or less, and the control unit may be configured to determine release of the first autonomous driving difficult section when the total number of times that the autonomous driving is difficult included in the reporting data in the first autonomous driving difficult section is the prescribed number of times or less. When the total number of times that the autonomous driving being difficult included in the reporting data in the first autonomous driving difficult section is the prescribed number of times or less, it can be determined that the autonomous driving vehicles have been able to move without having difficulty in the first autonomous driving difficult section. Thus, the information processing apparatus can appropriately release the autonomous driving difficult section with the difficulty state information.

An information processing method according to a second aspect of the present disclosure is an information processing method involving communication with a plurality of autonomous driving vehicles. The information processing method includes: storing a location of an autonomous driving difficult section on a map in association with a predetermined release condition in a storage unit, the autonomous driving difficult section being a traveling section where autonomous driving is difficult; acquiring from the plurality of autonomous driving vehicles reporting data of each of the autonomous driving vehicles by a control unit through communication, the reporting data including a location of the vehicle on the map and at least one of reliability of the autonomous driving, difficulty state information indicative of the autonomous driving being difficult or not difficult, and a result of driver intervention; and determining by the control unit whether or not to release the autonomous driving difficult section based on the acquired reporting data and on the stored location and release condition of the autonomous driving difficult section.

According to the information processing method in the second aspect of the present disclosure, a location of a first autonomous driving difficult section that is the autonomous driving difficult section on the map is stored in the storage unit in association with a first release condition as the release condition that the reliability of the autonomous driving is not at a threshold value or below, and the first autonomous driving difficult section is determined to be released by the control unit when the reporting data in the first autonomous driving difficult section does not include the reliability at the threshold value or below.

According to the information processing method in the second aspect of the present disclosure, a location of a second autonomous driving difficult section that is the autonomous driving difficult section on the map is stored in the storage unit in association with a second release condition as the release condition that the total number of times of driver intervention is a prescribed number of times or less, and the second autonomous driving difficult section is determined to be released by the control unit when the total number of times of the driver intervention included in the reporting data in the second autonomous driving difficult section is the prescribed number of times or less.

In the second aspect of the present disclosure, the second autonomous driving difficult section may be a section set as the autonomous driving difficult section where the driver intervention occurs more than the prescribed number of times.

According to the information processing method in the second aspect of the present disclosure, a location of a first autonomous driving difficult section that is the autonomous driving difficult section on the map is stored in the storage unit in association with a first release condition as the release condition that the total number of times that the autonomous driving is difficult is a prescribed number of times or less, and the first autonomous driving difficult section is determined to be released by the control unit when the total number of times of the autonomous driving is difficult included in the reporting data in the first autonomous driving difficult section is the prescribed number of times or less.

According to various aspects of the present disclosure, it is possible to appropriately release the autonomous driving difficult section.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, the present embodiment will be described with reference to the accompanying drawings. In the description below, like or corresponding component members are designated by like reference numerals to omit redundant explanation.

[Outline of Vehicle Communication System]

Figure 1:
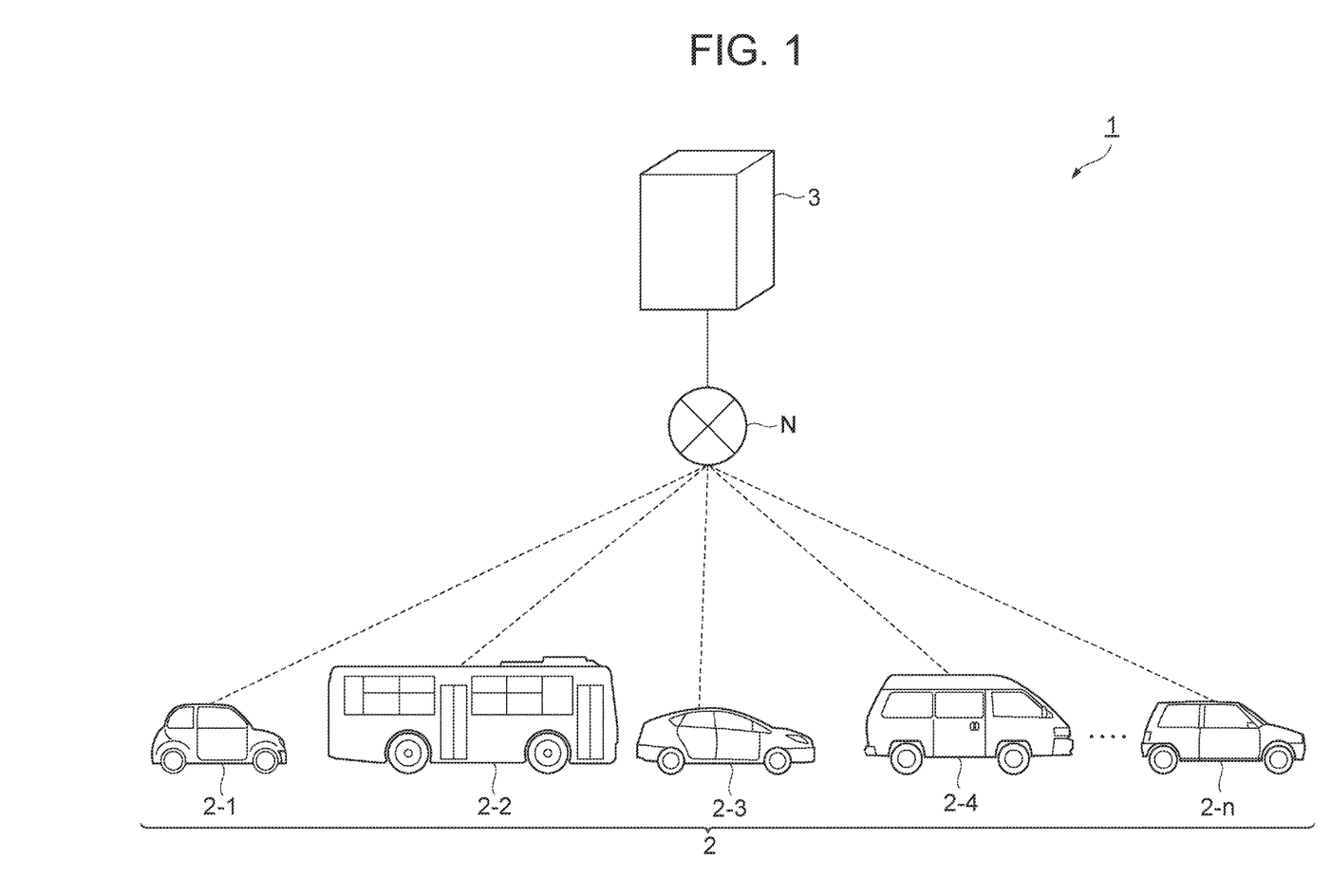
FIG. 1 is an explanatory view of a vehicle communication system.

FIG. 1 is an explanatory view of a vehicle communication system. As illustrated in FIG. 1, the vehicle communication system 1 includes a plurality of vehicles 2 and a server 3.

The plurality of vehicles 2 include a vehicle 2-1 to vehicle 2-n. N is a natural number larger than one. The vehicle 2-1 to vehicle 2-n are vehicles including a two-way communication function. The vehicle 2 includes an autonomous driving function. The vehicle 2 includes well-known component members, such as a speed sensor, necessary for traveling. The vehicle 2 travels on a road by operating an actuator and the like by driving operation of a driver or by the autonomous driving function. The vehicle 2-1 to vehicle 2-n are configured to be able to communicate with the server 3 through a network N. For example, the network N is the Internet or a privately leased line.

The server 3 acquires information from the plurality of vehicles 2 through the network N. The server 3 acquires and collects information such as a location, a speed, sensor information, operating information on an onboard system or onboard equipment, reliability of autonomous driving by an autonomous driving system, and the number of times that the autonomous driving is overridden (one example of a driver intervention result) acquired from each of the plurality of vehicles 2. The server 3 also acquires information such as traffic congestion information, obstacle information, and service area information from other servers, and distributes the acquired information to the plurality of vehicles 2. The server 3 can also distribute information in response to requests from the plurality of vehicles 2. Thus, the plurality of vehicles 2 can share information through the server 3. The server 3 may also communicate with vehicles other than the autonomous driving vehicles.

The information that the plurality of vehicles 2 should share includes sections where autonomous driving is difficult where autonomous driving is difficult. The sections where autonomous driving is difficult are sections set on a map. The sections are set based on the information (information reported from the plurality of vehicles 2) acquired from the plurality of vehicles 2. The sections where autonomous driving is difficult, which are different from the autonomous driving prohibition sections where autonomous driving is prohibited, are traveling sections where the vehicles can travel by autonomous driving. The autonomous driving being difficult signifies that the vehicles fail to implement normal traveling as the autonomous traveling. Examples of the difficult autonomous driving include an autonomous steering of the vehicle 2 being unsteady, the vehicle 2 being unable to travel at the center of a lane, the speed of the vehicle 2 having extreme fluctuation, the speed of the vehicle 2 being unstable, and the vehicle 2 exceeding a limit speed of autonomous driving control in curves. Causes of the difficult autonomous driving include a difference between map information and a sensor recognition result when the vehicle 2 performs autonomous driving using both the map information and the sensor recognition result, and occurrence of phenomena causing deteriorated recognition precision of the sensor. The difference between the map information and the sensor recognition result is generated when the map is not sufficiently updated to catch up with actual road changes, such as changes in road geometries due to construction works, changes in road marks, changes in signboards, and existence of falling objects. Or the difference is generated when the recognition precision of the onboard sensor is deteriorated due to blurred street boundary lines or due to fog.

The autonomous driving difficult section is set for the traveling sections where the aforementioned examples (unstable steering, speed, etc.) of the difficult autonomous driving are detected. The autonomous driving difficult section may be set for the traveling sections where driver intervention frequently occurs. The driver intervention is an override of the autonomous driving by steering operation, accelerator pedal operation, and brake pedal operation. The phrase "the autonomous driving difficult section is set" signifies that the location information is associated with the information indicative of the autonomous driving difficult section. Who sets the autonomous driving difficult section is not limited. That is, the autonomous driving difficult section may be set by the server 3, the vehicles 2, or by other servers.

The server 3 stores locations of the sections where autonomous driving is difficult on the map. The server 3 can distribute the locations of the sections where autonomous driving is difficult to the plurality of vehicles 2. Accordingly, the information on the sections where autonomous driving is difficult is shared by the plurality of vehicles 2. The vehicles 2 may inform drivers that the vehicles 2 are approaching the sections where autonomous driving is difficult, or may advice the drivers to travel in the sections where autonomous driving is difficult by manual driving.

When the cause of a difficult autonomous driving is eliminated, the autonomous driving difficult section should swiftly be released. The server 3 releases the autonomous driving difficult section as described later. The server 3 can distribute the release of the autonomous driving difficult section to the plurality of vehicles 2. Accordingly, the release of the autonomous driving difficult section is shared by the plurality of vehicles 2.

[Detailed Configuration of Vehicle Communication System]

[Vehicle]

Figure 2:
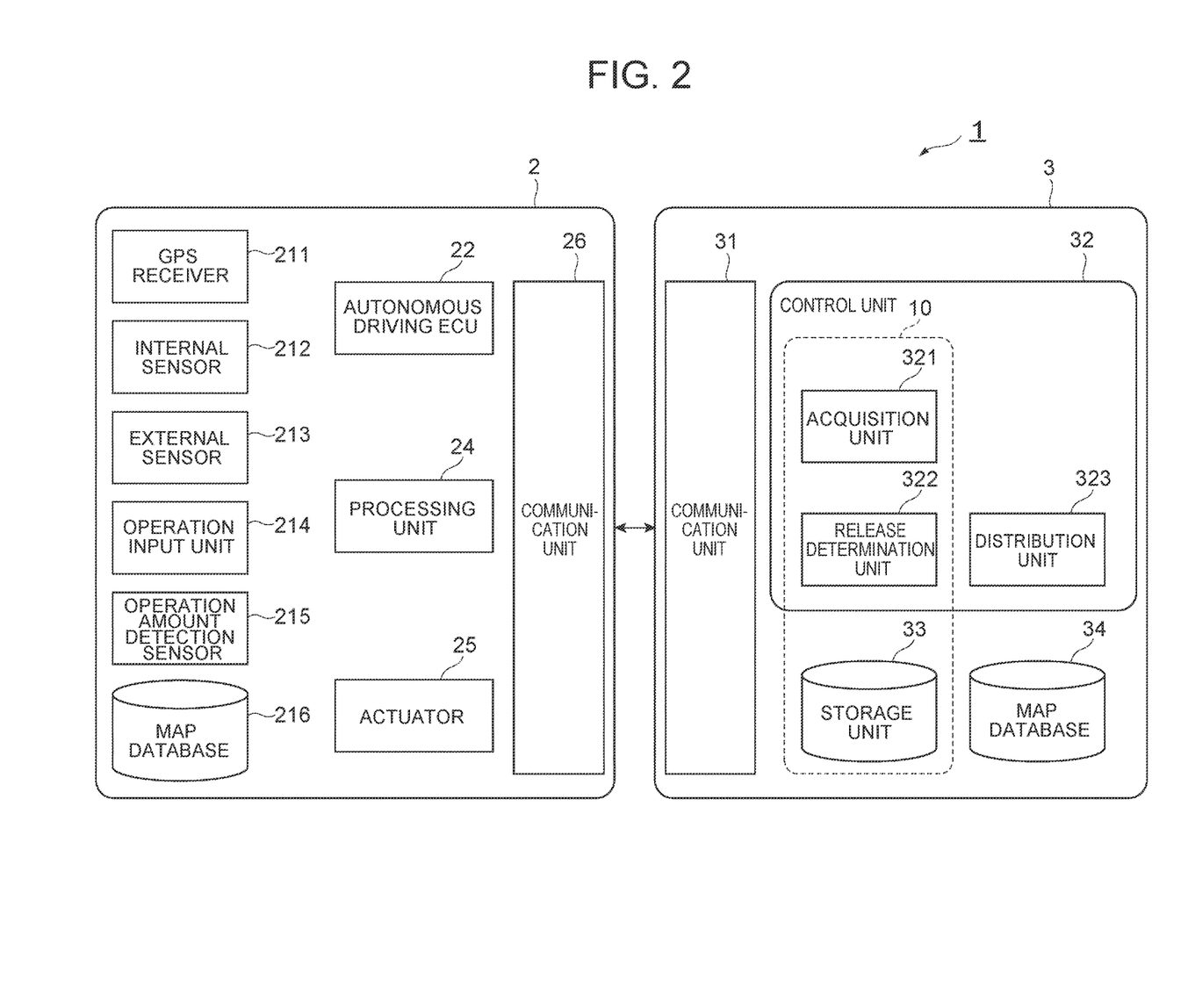
FIG. 2 is a block diagram illustrating the configuration of a vehicle communication system.

FIG. 2 is a block diagram illustrating the configuration of a vehicle communication system 1. As illustrated in FIG. 2, the vehicle 2 includes, for example, a global positioning system (GPS) receiver 211, an internal sensor 212, an external sensor 213, an operation input unit 214, an operation amount detection sensor 215, a map database 216, an autonomous driving electronic control unit (ECU) 22, a processing unit 24, an actuator 25, and a communication unit 26.

The GPS receiver 211 is a device that receives GPS signals. The GPS receiver 211 receives signals from three or more GPS satellites to measure the location of the vehicle 2 (one example of the traveling state). For example, the location of the vehicle 2 is expressed as location information, such as a latitude and a longitude. The GPS receiver 211 transmits the measured location information on the vehicle 2 to the autonomous driving ECU 22 and the processing unit 24.

The internal sensor 212 is a detector that detects the motion state (one example of the traveling state) of the vehicle 2. One example of the internal sensor 212 includes a vehicle speed sensor, an acceleration sensor, and a yaw rate sensor. The vehicle speed sensor is a detector that detects the speed of the vehicle 2. One example of the vehicle speed sensor is a wheel speed sensor. The acceleration sensor is a detector that detects acceleration of the vehicle 2. One example of the acceleration sensor is a sensor that uses a weight supported by a spring to detect acceleration from a displacement amount of the spring. The yaw rate sensor is a detector that detects the yaw rate of the vehicle 2. One example of the yaw rate sensor is a gyro sensor. The internal sensor 212 transmits the motion state of the vehicle 2 to the autonomous driving ECU 22 and the processing unit 24.

The external sensor 213 is a detector that detects circumstances around the vehicle 2. One example of the external sensor 213 includes a camera, a radar, and a laser imaging detection and ranging (LIDAR). The camera is an imaging device that images external circumstances of the vehicle 2. The radar is a detector that detects an obstacle outside the vehicle 2 using electric waves (such as millimeter waves). The LIDAR is a detector that detects an obstacle outside the vehicle 2 using light. The external sensor 213 transmits the circumstances around the vehicle 2 to the autonomous driving ECU 22 and the processing unit 24.

The operation input unit 214 is a device that receives operation by the driver. One example of the operation input unit 214 include a steering wheel that receives steering operation, a brake pedal that receives brake operation, and an accelerator pedal that receives accelerator operation. The operation input unit 214 transmits a signal corresponding to the driving operation to the actuator 25.

The operation amount detection sensor 215 detects the operation amounts of acceleration and deceleration operation and steering operation by the driver of the vehicle 2. For example, the operation amount detection sensor 215 includes at least one of an accelerator pedal sensor, a brake pedal sensor, and a steering sensor.

The accelerator pedal sensor is a detector that detects a stepping-in amount of the accelerator pedal. For example, the stepping-in amount of the accelerator pedal is a position (pedal position) of the accelerator pedal with a specified position as a reference. For example, the accelerator pedal sensor may be attached to a shaft portion of the accelerator pedal of the vehicle 2. The accelerator pedal sensor outputs a signal corresponding to the stepping-in amount of the accelerator pedal to the autonomous driving ECU 22.

The brake pedal sensor is a detector that detects the stepping-in amount of the brake pedal. The brake pedal sensor may detect operating force (such as tread force applied to the brake pedal, and pressure of a master cylinder) of the brake pedal. The brake pedal sensor outputs a signal corresponding to the stepping-in amount or the operating force of the brake pedal to the autonomous driving ECU 22.

The steering sensor is a detector that detects a rotating state of the steering. For example, a detection value of the rotating state is a steering torque or a steering angle (an operation amount of steering operation). For example, the steering sensor is attached to the steering shaft of the vehicle 2. The steering sensor outputs a signal corresponding to the steering torque or the steering angle of the steering to the autonomous driving ECU 22.

The map database 216 is a database that stores map information. The map information is the data with which a map can be created. The map information includes information such as location information on roads, information on road geometries (such as types of curves and straight roads, and curvature of the curves), width information on the roads, height information on the roads, location information on junctions and branch points, and location information on buildings. The map database 216 may be synchronized with a later-described map database 34 of the server 3 at specified intervals.

The autonomous driving ECU 22 is an electronic control unit having an arithmetic unit such as a central processing unit (CPU), a storage device such as a read only memory (ROM) and a random access memory (RAM), a controller area network (CAN) communication circuit, and the like. The autonomous driving ECU 22 has later-described functions implemented when the CPU of the autonomous driving ECU 22 loads and executes programs stored in the storage device.

The autonomous driving ECU 22 is mounted on the vehicle 2 to execute autonomous driving of the vehicle 2. The autonomous driving is vehicle control to cause autonomous traveling of the vehicle without driving operation of the driver. Society of Automotive Engineers (SAE) J3016 prescribes levels of driving automation in accordance with the degree of autonomous driving.

The autonomous driving ECU 22 generates a travel plan along a target route preset based on the location information on the vehicle 2 in the GPS receiver 211, the map information in the map database 216, and the detection results of the internal sensor 212 and the external sensor 213. The target route is set by the driver or a publicly known navigation system. The autonomous driving ECU 22 executes autonomous driving in accordance with the travel plan. The autonomous driving ECU 22 executes autonomous driving by transmitting a control signal to the actuator of the vehicle 2. The autonomous driving ECU 22 generates the travel plan with a well-known technique and also executes autonomous driving.

The autonomous driving ECU 22 may execute autonomous driving and also calculate the reliability of the autonomous driving. The reliability of the autonomous driving is a criterion of the certainty of determination or performance in autonomous driving. A larger reliability value indicates a higher reliability of the autonomous driving. The reliability of the autonomous driving includes the reliability of recognition, the reliability of vehicle location, and the reliability of the travel plan.

The reliability of recognition is dependent on the performance of the internal sensor 212 and the external sensor 213 and is also dependent on a traveling environment. For example, when the recognition result does not match with the map information due to an obstacle blocking a road marking or a street boundary line, the reliability of recognition is calculated to be low. The reliability of recognition increases or decreases with weather conditions. For example, the reliability of recognition in bad weather is generally calculated to be lower than that in a fine day. In a specific example, the reliability of recognition has a reference value of 1, and when a falling object is present on a road, a specified value (for example, 0.3) is subtracted from the reference value, so that the reliability becomes 0.7.

When the recognition result does not match with the map information, the reliability of recognition is calculated to be low in accordance with a difference between the recognition result and the map information. Such a difference is divided into two types: a difference in the case where the recognition result is right and the map information is wrong (or when the recognition result indicates that an object not included in the map information is detected); and a difference in the case where the recognition result is wrong and the map information is right. The case where the map information is wrong is the case caused by the map information not updated enough to catch up with changes in actual roads. For example, the road changes are caused by road repairing and the like. The road changes refer to changes in positions or types of street boundary lines, center lines, and road markings, removal of signboards, and changes in road curvature, road width, and speed limit.

The reliability of recognition is based on the map information. Accordingly, when update of the map is delayed, the reliability of autonomous driving is lowered even when the recognition result correctly reflects an actual road environment.

The reliability of the vehicle location is dependent on the performance of the GPS and is also dependent on the traveling environment. For example, the reliability of the vehicle location is calculated to be higher when no building is located in the vicinity of the vehicle 2 than when there is a building located therein. Like the reliability of the recognition, the reliability of the vehicle location can be calculated by preparing a reference value and subtracting or adding a preset value from or to the reference value.

The reliability of the travel plan can be evaluated based on similarity between a path plan of the vehicle traveling in the travel plan and a track of the vehicle traveling at the center of a lane. For example, the reliability of the travel plan is calculated to be higher as the path plan is closer to the track of the vehicle traveling at the center of a lane than to the track of avoiding an obstacle. Like the reliability of the recognition, the reliability of the travel plan can be calculated by preparing a reference value and subtracting or adding a preset value from or to the reference value.

The aforementioned reliability of the autonomous driving may be expressed as a sum total value, an average value, or a representative value of the reliability of the recognition, the reliability of the vehicle location, and the reliability of the travel plan. The autonomous driving ECU 22 may lower the reliability, when the autonomous driving exceeds the limit of support. The autonomous driving ECU 22 transmits the autonomous driving reliability to the processing unit 24.

When a preset termination condition of autonomous driving is satisfied, the autonomous driving ECU 22 ends the autonomous driving and shifts the vehicle 2 to manual driving. The manual driving is a driver-oriented driving mode in which the vehicle travels based on driving operation by the driver. The termination condition of the autonomous driving includes a condition where intervention operation by the driver is performed. The autonomous driving ECU 22 determines whether or not the intervention operation by the driver is present based on a signal output by the operation amount detection sensor 215. The autonomous driving ECU 22 transmits to the processing unit 24 the determination result as a driver intervention result. The driver intervention result is the information about the intervention operation by the driver. The information includes the presence of intervention operation and types (steering operation, brake operation, accelerator operation) of the intervention operation. The autonomous driving ECU 22 also transmits an autonomous driving end signal to the processing unit 24.

The processing unit 24 is a control device which is an electronic control unit having an arithmetic unit such as a CPU, a storage device such as a ROM and a RAM, a CAN communication circuit, and the like. The processing unit 24 uses the location of the vehicle 2 on the map obtained by using the location information acquired from the GPS receiver 211 and the map of the map database 216, as well as some of or all of the information output from the internal sensor 212, the external sensor 213, and the autonomous driving ECU 22 to generate reporting data. The reporting data is the data output to the server 3, the data including the location on the map, the reliability of the autonomous driving or the driver intervention result. As described in the foregoing, the reliability of the autonomous driving and the driver intervention result are the information output by the autonomous driving ECU 22. The location on the map is the location of the vehicle 2 on the map in the map database 216 as described in the foregoing. That is, the location on the map is the location of the vehicle 2 on the map when the aforementioned reliability of the autonomous driving is calculated or the location of the vehicle 2 on the map when the aforementioned driver intervention is present.

The processing unit 24 transmits the reporting data to the server 3 through the communication unit 26. The processing unit 24 may create the reporting data of one cycle by using the information in a predetermined period and transmit the reporting data to the server 3 in a specified cycle, or may transmit the accumulated reporting data in response to a request from the server 3. The communication unit 26 is a communication device in conformity with communications protocols of the network N. The processing unit 24 also outputs a request signal to request information to the server 3 through the communication unit 26, and acquires the information from the server 3.

The actuator 25 is a device that executes traveling control of the vehicle 2. The actuator 25 includes at least a well-known engine actuator, brake actuator, and steering actuator. The actuator 25 operates based on a signal from the operation input unit 214, or a control signal from the autonomous driving ECU 22.

[Server]

The server 3 can communicate with the vehicles 2. In one example, the server 3 includes a communication unit 31, a control unit 32, a storage unit 33, and a map database 34.

The communication unit 31 is a communication device in conformity with the communications protocols of the network N. The control unit 32 is an arithmetic unit such as a CPU. Functionally, the control unit 32 includes an acquisition unit 321, a release determination unit 322, and a distribution unit 323. The information processing apparatus 10, which includes the acquisition unit 321, the release determination unit 322, and the storage unit 33, can communicate with the plurality of vehicles 2. The control unit 32 does not need to include the distribution unit 323.

The acquisition unit 321 acquires the reporting data from the plurality of vehicles 2 through communication. The acquisition unit 321 acquires the reporting data from the vehicle 2 through the network N and the communication unit 31. The acquisition unit 321 may acquire the reporting data transmitted from the vehicles 2 in a specified cycle, or may request the reporting data from the vehicle 2 at specified timing. The acquisition unit 321 accumulates the acquired reporting data in the storage unit 33. For example, the acquisition unit 321 may accumulate the reporting data in association with acquisition time, or may accumulate the reporting data in association with acquisition time for every section (location).

The storage unit 33 stores the location of an autonomous driving difficult section on the map in association with a predetermined release condition. The autonomous driving difficult section is a traveling section where autonomous driving is difficult. The location of the autonomous driving difficult section on the map is the location on the map in the later-described map database 34. The release condition is a requirement provided in order to release the autonomous driving difficult section. The release condition relates to the reliability of the autonomous driving or the driver intervention result. The release condition is set for every autonomous driving difficult section. The autonomous driving difficult section is released when the release condition is satisfied. The term "release" signifies that the autonomous driving difficult section is changed to a general traveling section. How to release the autonomous driving difficult section is not particularly specified. For example, the autonomous driving difficult section can be released by deleting a flag indicative of the autonomous driving difficult section or by deleting pertinent data from a table that stores the autonomous driving difficult section. The phrase "the location (traveling section) of the autonomous driving difficult section on the map is stored in association with the release condition" signifies that the location and the release condition of the autonomous driving difficult section are stored in the storage unit 33 in a linked state so that the release condition can be acquired based the location.

Figure 3:
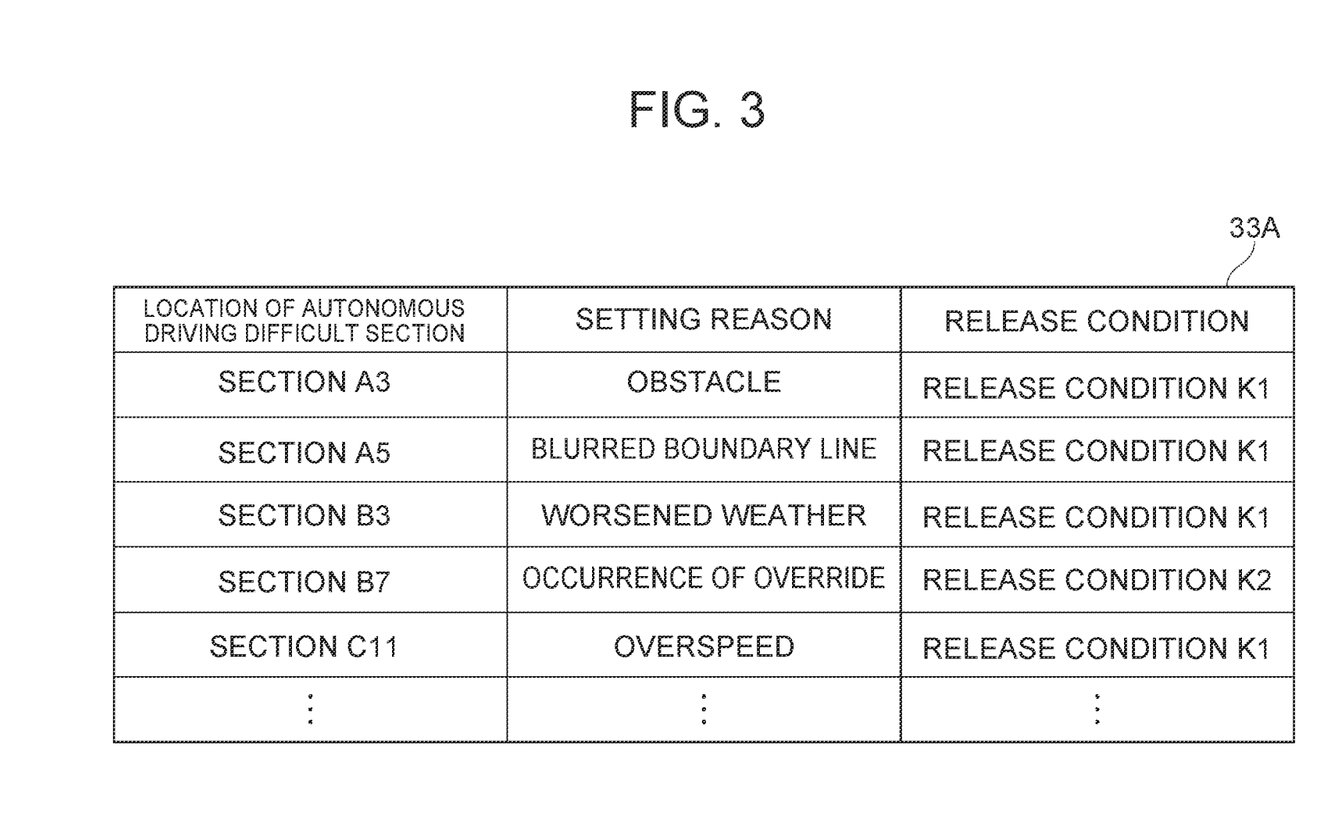
FIG. 3 is one example of a release table.

FIG. 3 is one example of a release table stored in the storage unit 33. A release table 33A is a table that associates the locations of the sections where autonomous driving is difficult with the release conditions thereof. In an example illustrated in FIG. 3, the location of an autonomous driving difficult section "section A3" is associated with a release condition "release condition K1". The location of an autonomous driving difficult section "section A5" is associated with the release condition "release condition K1". The location of an autonomous driving difficult section "section B3" is associated with the release condition "release condition K1". The location of an autonomous driving difficult section "section B7" is associated with a release condition "release condition K2". The location of an autonomous driving difficult section "section C11" is associated with the release condition "release condition K1".

Figure 4A:
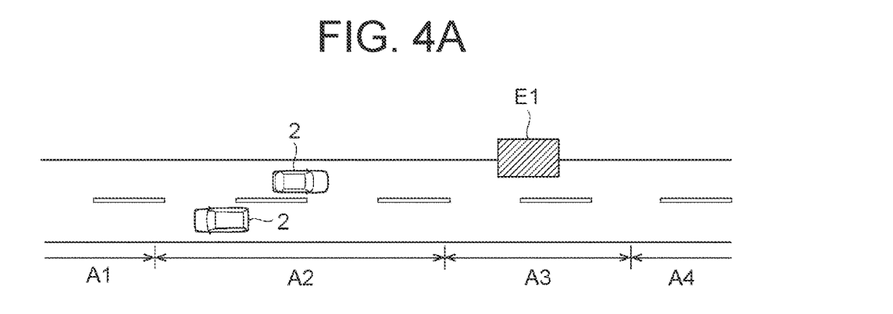
FIG. 4A is an explanatory view of an autonomous driving difficult section.

Each release condition relates to a reason that the autonomous driving difficult section is set. FIGS. 4A, 4B, 4C, and 4D are explanatory views of the sections where autonomous driving is difficult. FIG. 4A illustrates the situation where an obstacle E1 is present in the section A3 of a road where the vehicle 2 travels. The obstacle E1 is a falling object or a parking vehicle. The section A3 is set as the autonomous driving difficult section based on the detection information on an obstacle reported from the vehicles 2. When the vehicle 2 travels in the section A3, the reliability of the autonomous driving deteriorates due to a difference present between the recognition result and the map information. Meanwhile, when the obstacle E1 is removed, the reliability of the autonomous driving is recovered since the recognition result and the map information are matched with each other. That is, recovery of the system reliability is set as the release condition K1 (first release condition) for the section A3 that is the autonomous driving difficult section (first autonomous driving difficult section) illustrated in FIG. 4A. The recovery of the reliability of the autonomous driving signifies that the reliability of the autonomous driving is not at or below a threshold value, for example. The release table 33A stores the section A3 in association with the release condition Kl. Thus, the release condition is set with the reliability of the autonomous driving of the vehicle 2.

Figure 4B:
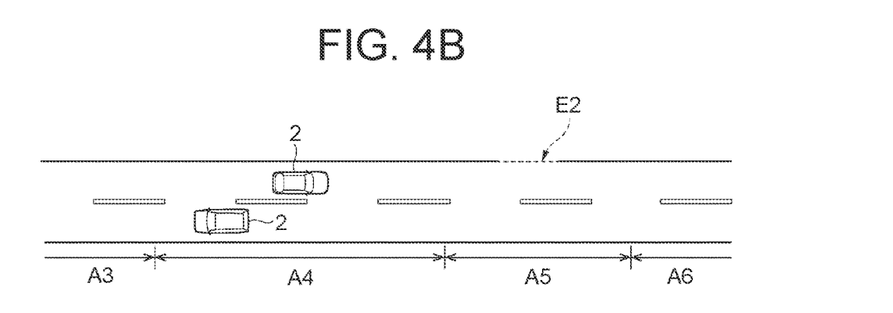
FIG. 4B is an explanatory view of an autonomous driving difficult section.

FIG. 4B illustrates the circumstances where a street boundary line E2 is blurred in the section A5 of the road where the vehicle 2 travels. The section A5 is set as the autonomous driving difficult section based on the information on the street boundary line reported from the vehicle 2. When the vehicle 2 travels in the section A5, the reliability of the autonomous driving is deteriorated due to a difference present between the recognition result and the map information. When the street boundary line E2 is repaired, the reliability of the autonomous driving is recovered since the recognition result and the map information are matched with each other. That is, recovery of the system reliability is set as the release condition K1 (first release condition) for the section A5 that is the autonomous driving difficult section (first autonomous driving difficult section) illustrated in FIG. 4B. The release table 33A stores the section A5 in association with the release condition K1. Thus, the release condition is set with the reliability of the autonomous driving of the vehicle 2.

While FIG. 4B illustrates an example of the autonomous driving difficult section set due to the road changes, there are various road changes other than the blurred street boundary line E2. For example, the road changes include a change in line type, removal and increase of signboards, and deletion and modification of road markings caused by temporary construction. When the vehicle 2 reports detection of such road changes in a certain section, the section is set as the autonomous driving difficult section as in the case of the section A5, and the release condition K1 is imparted to the section. The reliability of the autonomous driving may be recovered when the map is updated. That is, the autonomous driving difficult section may be released by the update of the map.

Figure 4C:
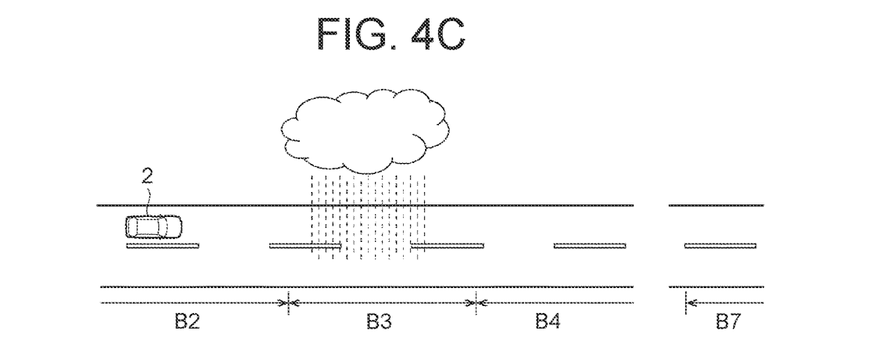
FIG. 4C is an explanatory view of an autonomous driving difficult section.

FIG. 4C illustrates the circumstances where the vehicle 2 travels in the section B3 of the road in bad weather due to rainy weather. The section B3 is set as the autonomous driving difficult section based on the detection information on the bad weather reported from the vehicle 2. When the vehicle 2 travels in the section B3, sensor recognition is hindered, so that the reliability of the autonomous driving is deteriorated. When the weather gets better, the sensor recognition returns to a normal state, so that the reliability of the autonomous driving is recovered. That is, recovery of the autonomous driving reliability is set as the release condition K1 (first release condition) for the section B3 that is the autonomous driving difficult section (first autonomous driving difficult section) illustrated in FIG. 4C. The release table 33A stores the section B3 in association with the release condition K1. Thus, the release condition is set with the reliability of the autonomous driving of the vehicle 2. For a low friction road, the release condition K1 is set as in the case of bad weather.

Figure 4D:
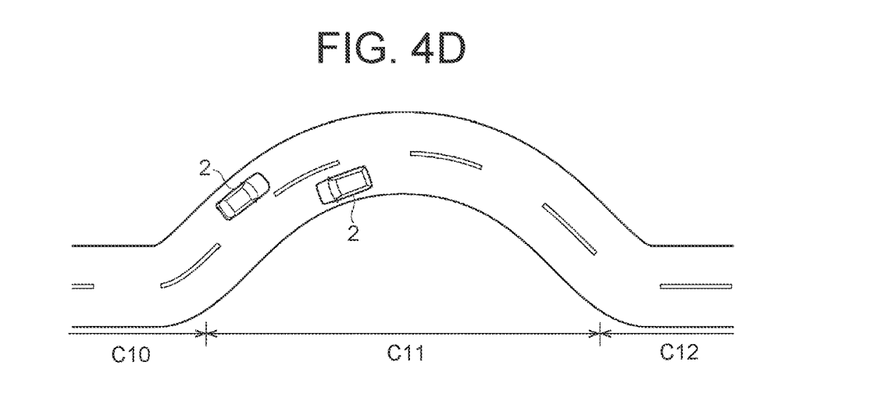
FIG. 4D is an explanatory view of an autonomous driving difficult section.

FIG. 4D illustrates the circumstances where the section C11 of the road where the vehicle 2 travels is a curve. The section C11 is set as the autonomous driving difficult section based on detection information on a speed reported from the vehicle 2, the speed exceeding a support speed supported by the autonomous driving. When the speed exceeds the support speed of the autonomous driving, the reliability of the autonomous driving deteriorates. When the speed of the vehicle 2 during traveling along the curve is within the support speed, the reliability is recovered. More specifically, recovery of the system reliability is set as the release condition K1 (first release condition) for the section C11 that is the autonomous driving difficult section (first autonomous driving difficult section) illustrated in FIG. 4D. The release table 33A stores the section C11 in association with the release condition K1. Thus, the release condition is set with the reliability of the autonomous driving of the vehicle 2.

For example, when override frequently occurs in the section B7, the autonomous driving is not executed in accordance with the intension of the drivers. Accordingly, the section B7 is set as the autonomous driving difficult section (second autonomous driving difficult section). In the section B7, when the autonomous driving starts to be executed in accordance with the intension of the drivers, the number of times of the override decreases. That is, a release condition K2 (second release condition) is set where the total number of times of the override in a predetermined period is equal to or less than a specified value. The release table 33A stores the autonomous driving difficult section in association with the release condition K2. Thus, the release condition is set with the number of times of occurrence of the override during autonomous driving.

The release determination unit 322 determines whether or not to release a autonomous driving difficult section based on the reporting data acquired by the acquisition unit 321 and on the location and the release condition of the autonomous driving difficult section stored in the storage unit 33. For example, when determining release of the autonomous driving difficult section "section A3" illustrated in FIG. 3, the release determination unit 322 determines whether or not to release the autonomous driving difficult section based on the reporting data of the vehicle 2 traveling in "the section A3", and on the release condition Kl.

In a more specific example, the release determination unit 322 determines release of the autonomous driving difficult section (first autonomous driving difficult section) which is associated with the release condition K1, when the reporting data of the vehicle 2 traveling in the autonomous driving difficult section does not include reliability at or below a threshold value. The threshold value represents the reliability predetermined in order to determine whether or not to release the autonomous driving difficult section. The release determination unit 322 determines release of the autonomous driving difficult section (second autonomous driving difficult section) which is associated with the release condition K2, when the total number of times of driver intervention included in the reporting data of the vehicle 2 traveling in the autonomous driving difficult section is equal to or less than a prescribed number of times.

The distribution unit 323 transmits requested data to the vehicle 2 through the communication unit 31. For example, when there is an inquiry about an autonomous driving difficult section from the vehicle 2, the distribution unit 323 transmits the location information on the autonomous driving difficult section to the vehicle 2 through the communication unit 31. The distribution unit 323 transmits release information to the vehicle 2, when the autonomous driving difficult section is released. As a result, the autonomous driving difficult section shared by the plurality of vehicles 2 is released.

The map database 34 is identical in configuration to the map database 216 of the vehicle 2. The map database 34 may be synchronized with the map database 216 of the vehicle 2 at specified intervals.

[Flowchart]

Figure 5:
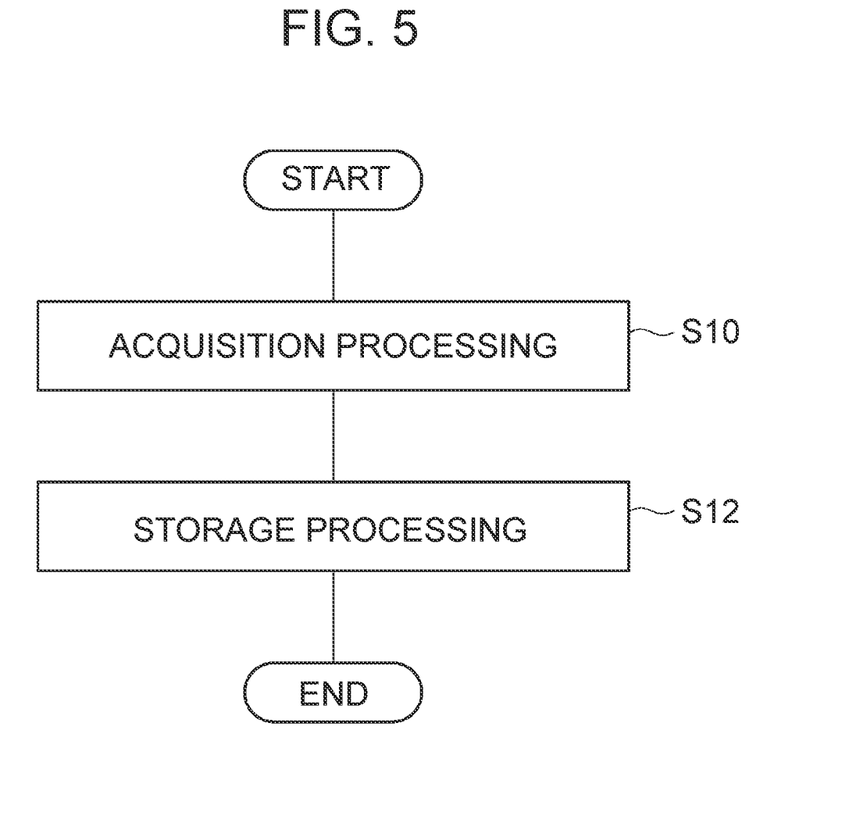
FIG. 5 is a flow chart of acquisition processing.

FIG. 5 is a flowchart of the acquisition processing of the information processing apparatus 10. The flowchart is started at the time when an instruction to operate the information processing apparatus 10 is received.

As illustrated in FIG. 5, the acquisition unit 321 of the information processing apparatus 10 performs acquisition processing (S10) to acquire reporting data from the vehicle 2. Next, the acquisition unit 321 performs storage processing (S12) to accumulate the reporting data together with acquisition time in the storage unit 33. That is the end of the flowchart. Once the flowchart is ended, the flowchart may be started at specified timing. In this case, the reporting data is stored in chronological order.

Figure 6:
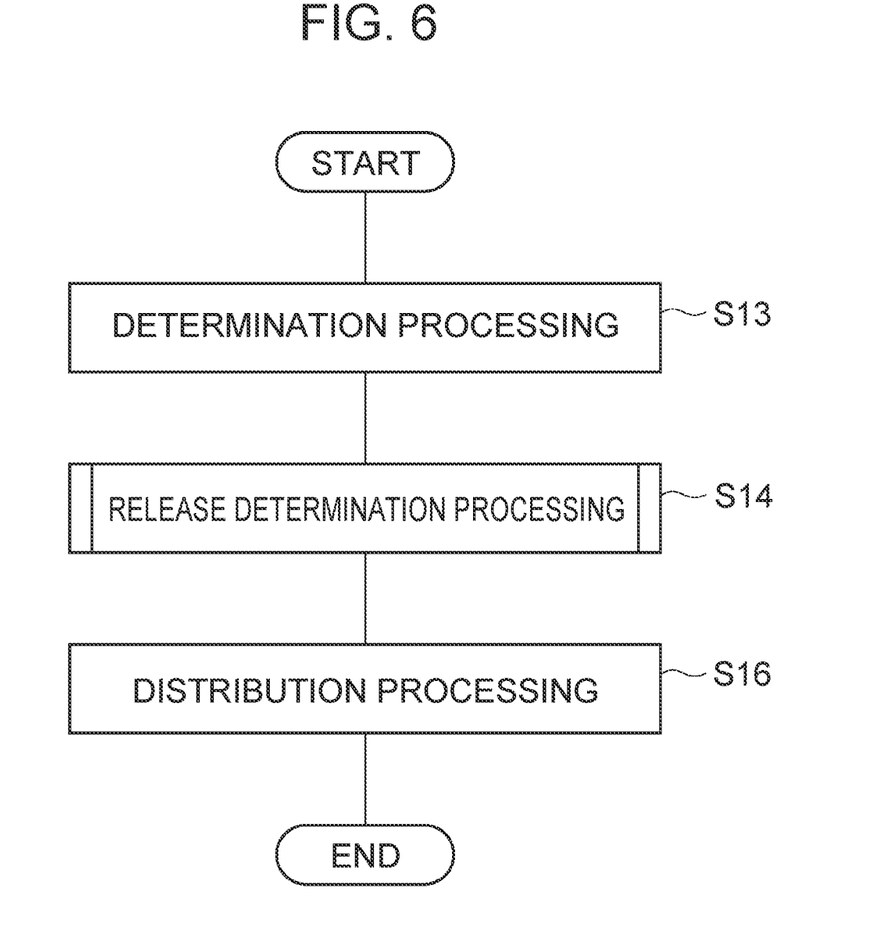
FIG. 6 is a flowchart of release determination processing.

FIG. 6 is a flowchart of the release processing of the information processing apparatus 10. The flowchart is executed after the flowchart illustrated in FIG. 5 is executed at least once and when an autonomous driving difficult section, which is a target of release determination, is specified. The flowchart may be performed in parallel to the flowchart illustrated in FIG. 5.

As illustrated in FIG. 6, the release determination unit 322 of the information processing apparatus 10 performs determination processing (S13). Then the release determination unit 322 of the information processing apparatus 10 performs release determination processing (S14) to acquire the release condition with respect to the location of an autonomous driving difficult section as a determination target. For example, the release determination unit 322 acquires the release condition associated with the location of an autonomous driving difficult section as a determination target with reference to the release table 33A. The release determination unit 322 makes a determination in accordance with the release condition. Then, the distribution unit 323 of the information processing apparatus 10 performs distribution processing (S16) that distributes the information on the autonomous driving difficult section.

Figure 7:
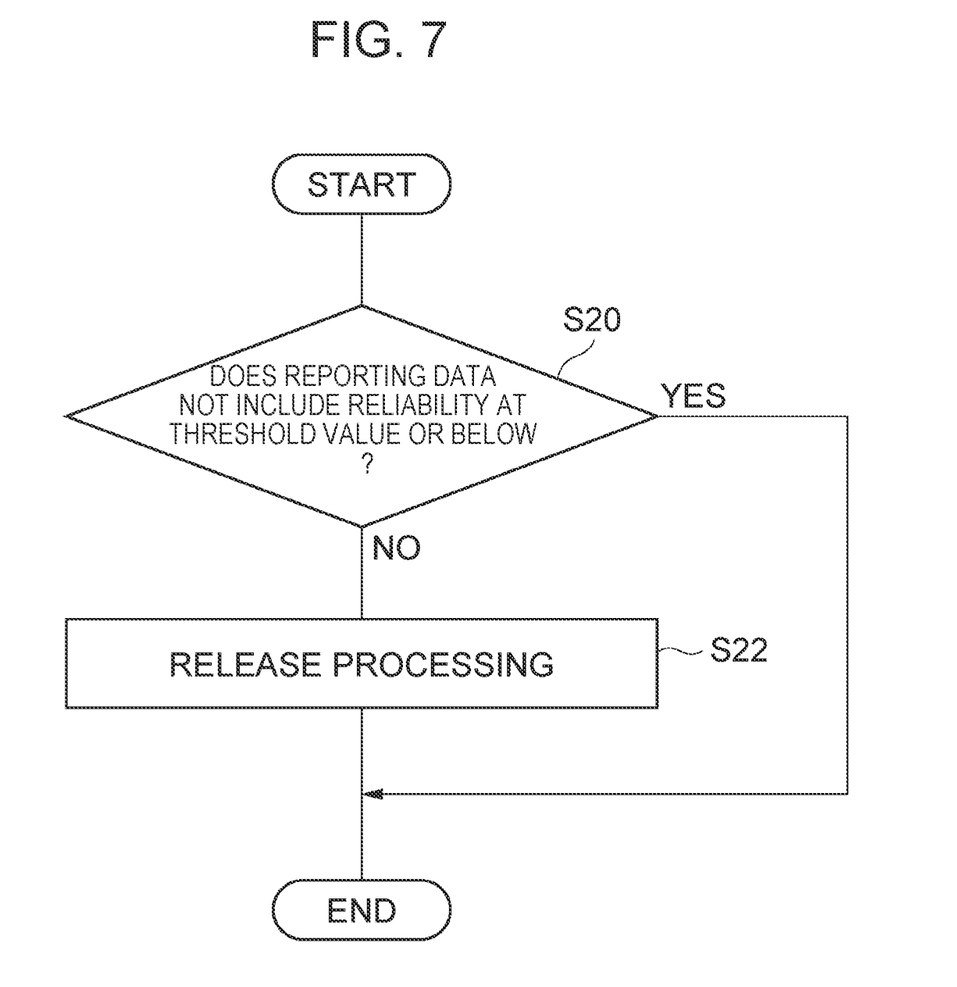
FIG. 7 is one example of a flowchart of release processing of a first autonomous driving difficult section.

When the autonomous driving difficult section as a determination target is associated with the release condition K1, determination is made on the scenes illustrated in FIGS. 4A to 4D. In this case, the release determination unit 322 executes the flowchart illustrated in FIG. 7. As illustrated in FIG. 7, the release determination unit 322 performs determination processing (S20) to determine whether or not the reporting data acquired from the vehicles passing through the autonomous driving difficult section as a determination target does not include reliability at or below a threshold value with reference to the reporting data accumulated in the storage unit 33. When the reporting data does not include reliability at or below the threshold value, the release determination unit 322 performs release processing (S22) to delete the autonomous driving difficult section as a determination target from the storage unit 33. When the release processing (S22) is ended, or when it is determined in the determination processing (S20) that the reporting data does not include reliability at or below the threshold value, the flowchart illustrated in FIG. 7 is ended.

Figure 8:
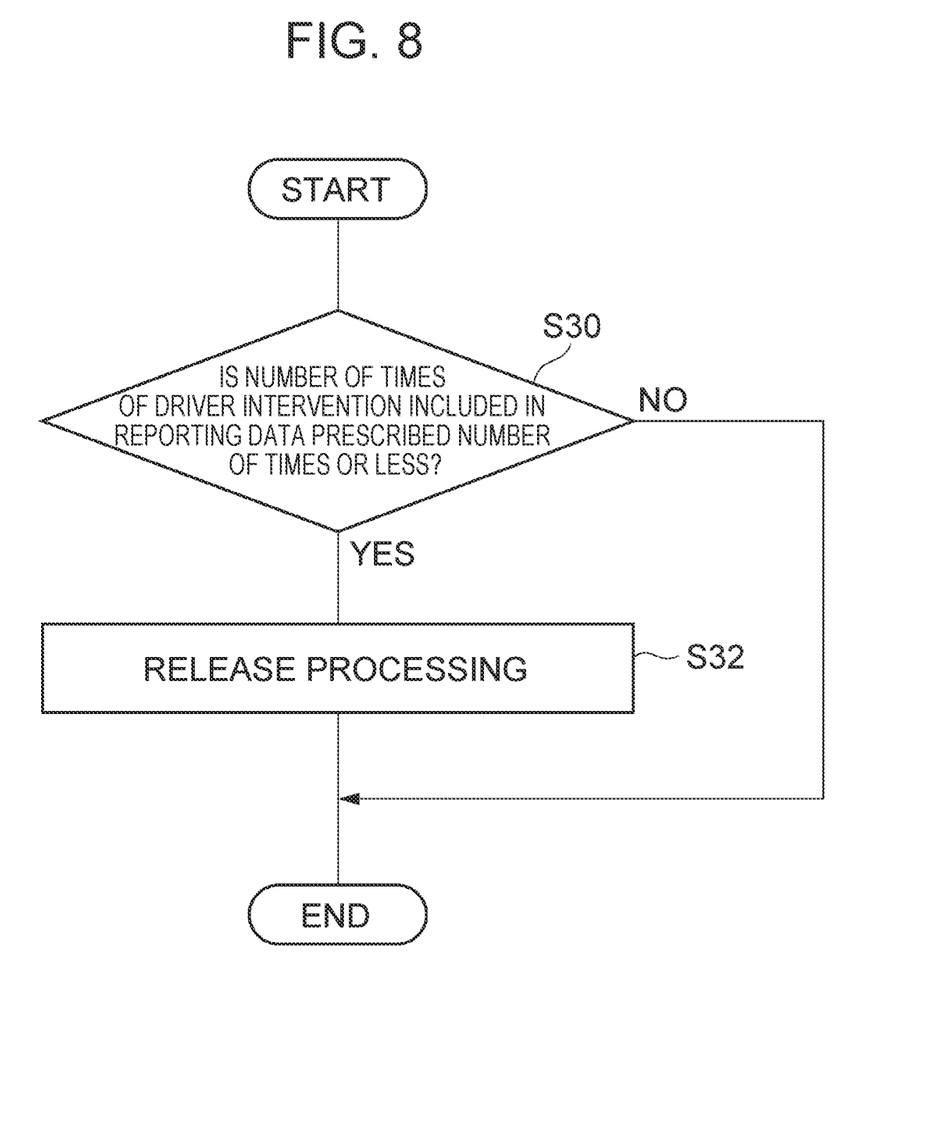
FIG. 8 is one example of a flowchart of release processing of a second autonomous driving difficult section.

When the autonomous driving difficult section as a determination target is associated with the release condition K2, the release determination unit 322 executes the flowchart illustrated in FIG. 8. As illustrated in FIG. 8, the release determination unit 322 performs determination processing (S30) to determine whether or not the total number of times of driver intervention included in the reporting data acquired from the vehicles passing through the autonomous driving difficult section as a determination target is equal to or less than a prescribed number of times with reference to the data accumulated in the storage unit 33. When the total number of times of the driver intervention included in the reporting data is the prescribed number of times or less, the release determination unit 322 performs release processing (S32) to delete the autonomous driving difficult section as a determination target from the storage unit 33. When the release processing (S32) is ended, or when it is determined in the determination processing (S30) that the total number of times of the driver intervention included in the reporting data is not at or below the prescribed number of times, the flowchart illustrated in FIG. 8 is ended.

After the flowchart illustrated in FIG. 7 or 8 is ended, the processing returns to FIG. 6. The distribution unit 323 of the information processing apparatus 10 distributes the information on the autonomous driving difficult section to the vehicles 2.

[Operational Effects of Embodiment]

In the information processing apparatus 10 according to the embodiment, the storage unit 33 stores the location of an autonomous driving difficult section on the map in association with a release condition thereof. The release determination unit 322 determines whether or not to release the autonomous driving difficult section based on the reporting data and on the location and the release condition of the autonomous driving difficult section. The reporting data includes the reliability of the autonomous driving or the result of driver intervention. Therefore, the information processing apparatus 10 determines whether or not to release the autonomous driving difficult section in consideration of the reliability of the autonomous driving or the result of the driver intervention based on the release condition. Accordingly, it is possible to appropriately release the autonomous driving difficult section as compared with the case of determining whether or not to release the autonomous driving difficult section based only on the validity term.

The embodiment disclosed may be carried out in modes to which various arrangements and modifications are applied based on the knowledge of those skilled in the art.

[Modification of Configuration]

The ECU may be constituted of a plurality of electronic control units. The server 3 may be constituted of a plurality of servers.

[Modification of Functions]

The release determination unit 322 of the server 3 may release the autonomous driving difficult section which is associated with the first release condition set due to road changes, when the map is updated. The acquisition unit 321 of the server 3 may acquire not the reliability of the autonomous driving itself but the difficulty state information calculated based on the reliability of the autonomous driving. In other words, the reporting data may include the location of the vehicle on the map, the reliability of autonomous driving, and the difficulty state information or the driver intervention result. The difficulty state information is the information indicative of the autonomous driving being difficult or not difficult, the information being generated based on the reliability of the autonomous driving. In this case, the processing unit 24 of the vehicle 2 determines whether the autonomous driving is difficult or not difficult based on the reliability of the autonomous driving, and transmits the reporting data including the difficulty state information. For example, the processing unit 24 of the vehicle 2 determines that the autonomous driving is difficult when the reliability of the autonomous driving is equal to or less than a threshold value. The processing unit 24 of the vehicle 2 determines that the autonomous driving is not difficult when the reliability of the autonomous driving is not at or below the threshold value.

In the case of using the difficulty state information, the release condition stored in the storage unit 33 of the server 3 is a condition relating to the difficulty state information. For example, the storage unit 33 of the server 3 may store the location of a first autonomous driving difficult section on the map in association with a first release condition as the release condition where the total number of times that the autonomous driving is difficult is equal to or less than a prescribed number of times. The release determination unit 322 of the server 3 may determine release of the first autonomous driving difficult section when the total number of times that the autonomous driving is difficult included in the reporting data in the first autonomous driving difficult section is equal to or less than the prescribed number of times. Thus, even in the case of using the difficulty state information, it is possible to appropriately release the autonomous driving difficult section.

What is claimed is:

1. An information processing apparatus capable of communicating with a plurality of autonomous driving vehicles, comprising:
    a storage unit configured to store a location of an autonomous driving difficult section on a map in association with a predetermined release condition, the autonomous driving difficult section being a traveling section where autonomous driving is difficult; and
    a control unit configured to acquire from the plurality of autonomous driving vehicles reporting data of each of the autonomous driving vehicles through communication, the reporting data including a location of the vehicle on the map and at least one of reliability of the autonomous driving, difficulty state information indicative of the autonomous driving being difficult or not difficult, and a result of driver intervention, and the control unit being configured to determine whether or not to release the autonomous driving difficult section on the map based on the acquired reporting data and on the location and the predetermined release condition of the autonomous driving difficult section stored in the storage unit.

2. The information processing apparatus according to claim 1, wherein
    the storage unit is configured to store a location of a first autonomous driving difficult section that is the autonomous driving difficult section on the map in association with a first release condition as the release condition that the reliability of the autonomous driving is not at a threshold value or below, and
    the control unit is configured to determine release of the first autonomous driving difficult section when the reporting data in the first autonomous driving difficult section does not include the reliability at the threshold value or below.

3. The information processing apparatus according to claim 2, wherein
    the first autonomous driving difficult section is a section set as the autonomous driving difficult section due to existence of an obstacle.

4. The information processing apparatus according to claim 2, wherein
    the first autonomous driving difficult section is a section set as the autonomous driving difficult section due to a blurred street boundary line.

5. The information processing apparatus according to claim 2, wherein
    the first autonomous driving difficult section is a section set as the autonomous driving difficult section due to bad weather.

6. The information processing apparatus according to claim 2, wherein
    the first autonomous driving difficult section is a section set as the autonomous driving difficult section based on detection of a speed exceeding support speeds of the autonomous driving.

7. The information processing apparatus according to claim 1, wherein
- the storage unit is configured to store a location of a second autonomous driving difficult section that is the autonomous driving difficult section on the map in association with a second release condition as the release condition that total number of times of driver intervention is a prescribed number of times or less, and
- the control unit is configured to determine release of the second autonomous driving difficult section when the total number of times of the driver intervention included in the reporting data in the second autonomous driving difficult section is the prescribed number of times or less.

8. The information processing apparatus according to claim 7, wherein
- the second autonomous driving difficult section is a section set as the autonomous driving difficult section where the driver intervention occurs more than the prescribed number of times.

9. The information processing apparatus according to claim 1, wherein
- the storage unit is configured to store a location of a first autonomous driving difficult section that is the autonomous driving difficult section on the map in association with a first release condition as the release condition that total number of times that the autonomous driving is difficult is a prescribed number of times or less, and
- the control unit is configured to determine release of the first autonomous driving difficult section when the total number of times that the autonomous driving is difficult included in the reporting data in the first autonomous driving difficult section is the prescribed number of times or less.

10. The information processing apparatus according to claim 1, wherein the predetermined release condition is a condition for changing the autonomous driving difficult section to a general traveling section.

11. An information processing method involving communication with a plurality of autonomous driving vehicles, comprising:
- storing a location of an autonomous driving difficult section on a map in association with a predetermined release condition in a storage unit, the autonomous driving difficult section being a traveling section where autonomous driving is difficult;
- acquiring from the plurality of autonomous driving vehicles reporting data of each of the autonomous driving vehicles by a control unit through communication, the reporting data including a location of the vehicle on the map and at least one of reliability of the autonomous driving, difficulty state information indicative of the autonomous driving being difficult or not difficult, and a result of driver intervention; and
- determining by the control unit whether or not to release the autonomous driving difficult section on the map based on the acquired reporting data and on the stored location and the predetermined release condition of the autonomous driving difficult section.

12. The information processing method according to claim 11, wherein
- a location of a first autonomous driving difficult section that is the autonomous driving difficult section on the map is stored in the storage unit in association with a first release condition as the release condition that the reliability of the autonomous driving is not at a threshold value or below, and
- the first autonomous driving difficult section is determined to be released by the control unit when the reporting data in the first autonomous driving difficult section does not include the reliability at the threshold value or below.

13. The information processing method according to claim 11, wherein
- a location of a second autonomous driving difficult section that is the autonomous driving difficult section on the map is stored in the storage unit in association with a second release condition as the release condition that total number of times of driver intervention is a prescribed number of times or less, and
- the second autonomous driving difficult section is determined to be released by the control unit when the total number of times of the driver intervention included in the reporting data in the second autonomous driving difficult section is the prescribed number of times or less.

14. The information processing method according to claim 13, wherein
- the second autonomous driving difficult section is a section set as the autonomous driving difficult section where the driver intervention occurs more than the prescribed number of times.

15. The information processing method according to claim 11, wherein
- a location of a first autonomous driving difficult section that is the autonomous driving difficult section on the map is stored in the storage unit in association with a first release condition as the release condition that total number of times that the autonomous driving is difficult is a prescribed number of times or less, and
- the first autonomous driving difficult section is determined to be released by the control unit when the total number of times that the autonomous driving is difficult included in the reporting data in the first autonomous driving difficult section is the prescribed number of times or less.

16. The information processing method according to claim 11, wherein the predetermined release condition is a condition for changing the autonomous driving difficult section to a general traveling section.

* * * * *